US009361328B1

(12) United States Patent
Ghiya

(10) Patent No.: US 9,361,328 B1
(45) Date of Patent: Jun. 7, 2016

(54) SELECTION OF FILES FOR ARCHIVAL OR DEDUPLICATION

(71) Applicant: Symantec Corporation, Mountain View, CA (US)

(72) Inventor: Murtaza S. Ghiya, Maharashtra (IN)

(73) Assignee: Veritas US IP Holdings LLC, Mountain View, CA (US)

( * ) Notice: Subject to any disclaimer, the term of this patent is extended or adjusted under 35 U.S.C. 154(b) by 463 days.

(21) Appl. No.: 13/761,496

(22) Filed: Feb. 7, 2013

Related U.S. Application Data

(63) Continuation of application No. 13/751,782, filed on Jan. 28, 2013.

(51) Int. Cl.
*G06F 17/30* (2006.01)

(52) U.S. Cl.
CPC .... *G06F 17/30303* (2013.01); *G06F 17/30156* (2013.01)

(58) Field of Classification Search
CPC .......... G06F 17/30156; G06F 11/1453; G06F 17/30303
See application file for complete search history.

(56) References Cited

U.S. PATENT DOCUMENTS

| | | | | |
|---|---|---|---|---|
| 5,873,103 | A * | 2/1999 | Trede et al. | |
| 8,595,243 | B1 * | 11/2013 | Gunda | 707/755 |
| 8,751,463 | B1 * | 6/2014 | Chamness | 707/693 |
| 8,933,899 | B2 * | 1/2015 | Shahparnia et al. | 345/173 |
| 2009/0132616 | A1 * | 5/2009 | Winter et al. | 707/204 |
| 2010/0306283 | A1 * | 12/2010 | Johnson et al. | 707/803 |
| 2011/0161723 | A1 * | 6/2011 | Taleck et al. | 714/4.11 |
| 2011/0196822 | A1 * | 8/2011 | Zunger et al. | 707/609 |
| 2011/0246429 | A1 * | 10/2011 | Prahlad et al. | 707/679 |
| 2013/0151803 | A1 * | 6/2013 | Tofano | 711/165 |
| 2013/0159648 | A1 * | 6/2013 | Anglin et al. | 711/162 |
| 2013/0275541 | A1 * | 10/2013 | Wang et al. | 709/208 |
| 2013/0339298 | A1 * | 12/2013 | Muller et al. | 707/640 |
| 2014/0181813 | A1 * | 6/2014 | Deshpande et al. | 718/1 |

OTHER PUBLICATIONS

Wikipedia, "DiskXtender," http://en.wikipedia.org/w/index.php?title=DiskXtender&oldid=588545466, Dec. 13, 2013, 1 page.
"OpenText File System Archiving," http://www.opentext.com/2/global/products/products-archiving/products-opentext-file-system-archiving.htm, 2014, pp. 1-2.
"HP StorageWorks File System Extender Software (FSE)," http://h18000.www1.hp.com/products/quickspecs/12060_ca/12060_ca.html, Jun. 5, 2007, pp. 18.

* cited by examiner

*Primary Examiner* — Leslie Wong
(74) *Attorney, Agent, or Firm* — Campbell Stephenson LLP

(57) ABSTRACT

Various systems and methods for selection of files for archival or deduplication operations are disclosed. For example, one method involves analyzing a plurality of files, where the analyzing is based on one or more archiving policies. The method involves determining whether a first file of the plurality of files is to be archived or deduplicated, where the determining is based at least on the analysis. The method also involves, in response to a determination to archive the first file, generating a request to archive the first file.

17 Claims, 16 Drawing Sheets

1400

SELECTION OF FILES FOR ARCHIVAL OR DEDUPLICATION

CROSS-REFERENCE TO RELATED APPLICATIONS

The present patent application is a continuation of U.S. patent application Ser. No. 13/751,782, filed on Jan. 28, 2013, entitled "Resolving Reparse Point Conflicts When Performing File Operations" and is incorporated by reference herein in its entirety and for all purposes as if completely and fully set forth herein.

BACKGROUND OF THE INVENTION

1. Field of the Invention

This application relates to data protection and, more particularly, to reparse point handling during data protection activities such as archival and/or deduplication.

2. Description of the Related Art

As businesses increasingly rely on computers for their daily operations, managing the vast amount of business information generated and processed has become a significant challenge. Most large businesses have a wide variety of application programs managing large volumes of data stored on many different types of storage devices across various types of networks and operating system platforms. These storage devices can include tapes, disks, optical disks, and other types of storage devices and often include a variety of products that can be produced by different vendors. The storage devices can be included in storage area networks (SANs), which can include hundreds of storage devices (or more). To preserve data, it is often desirable to archive the data distributed among a business's storage devices. Unfortunately, however, the complexity of managing data that is stored, archived, and/or deduplicated tends to increase with the number of storage devices being used to store that data.

BRIEF DESCRIPTION OF THE DRAWINGS

The embodiments of the present disclosure may be better understood, and its numerous objects, features, and advantages made apparent to those skilled in the art by referencing the accompanying drawings.

Figure 1:
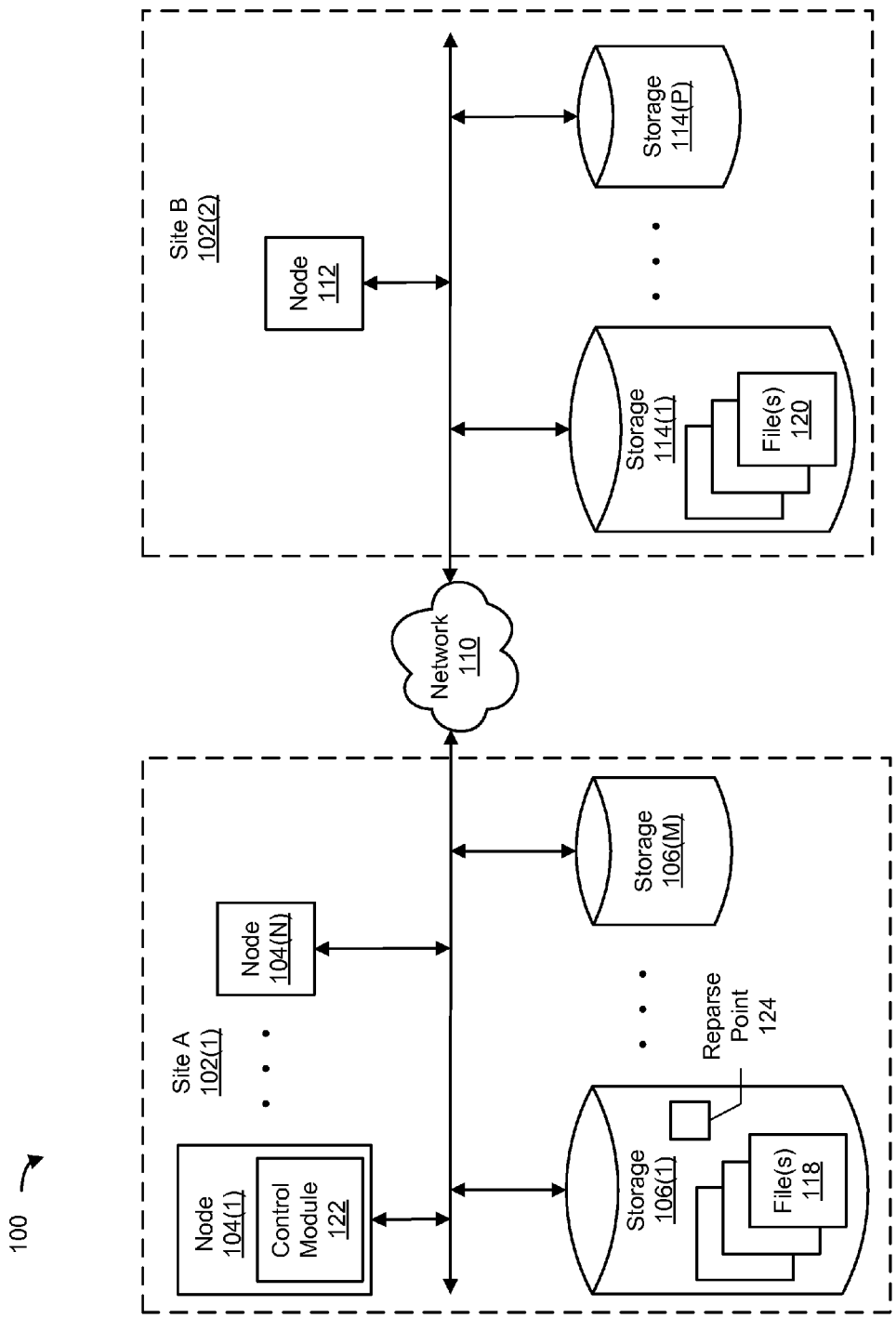
FIG. 1 is a block diagram illustrating a distributed storage system, according to one embodiment.

While the embodiments of the application are susceptible to various modifications and alternative forms, specific embodiments are provided as examples in the drawings and detailed description. It should be understood that the drawings and detailed description are not intended to limit the embodiments to the particular form disclosed. Instead, the intention is to cover all modifications, equivalents and alternatives falling within the spirit and scope of the invention as defined by the appended claims.

DETAILED DESCRIPTION

Embodiments of the present disclosure are directed to detecting and resolving reparse point conflicts, such as can occur when storing and operating on files. Embodiments of the present disclosure are also directed to determining whether to archive and/or deduplicate such files.

A reparse point is a file object that links the reparse point to a file that is stored at a certain location. When the reparse point is accessed (e.g., by an operating system), the operating system accesses the file at the location specified by the reparse point link. A reparse point can be generated when certain file operations are performed on a file, such as file archiving or file-based deduplication. A reparse point can be generated by the operating system and/or a control module. For example, a reparse point can be implemented as a shortcut that links one storage location (where the original file was stored) to another storage location (where the file is stored after the archiving file operation is performed).

A reparse point conflict occurs when there is an attempt to associate two or more reparse points with the same file. For example, an operating system can associate a first reparse point with a certain file. If another software entity (e.g., a control module), attempts to generate a second reparse point (that would be associated with the same file), a reparse point conflict occurs. In some implementations, an operating system only allows one reparse point to be associated with each file at a time. However, in one implementation, an operating system allows some other integer maximum number of reparse points to be associated with each file at a time.

A reparse point can already exist for a file prior to performance of an operation (e.g., an archival operation) that would otherwise create a new reparse point. The existing reparse point may have been created, for example, when the file was deduplicated prior to the archive operation being performed. As a result, a reparse point conflict occurs between the existing reparse point and the potentially new reparse point (i.e., associated with the to-be-performed file operation). Upon detection of this reparse point conflict, the system resolves the reparse point conflict, as described below with reference to various embodiments.

Furthermore, embodiments of the present disclosure are also directed to determining whether to archive and/or deduplicate files. This decision can be made by the control module, such as based on archiving policy.

FIG. 1 is a block diagram illustrating a distributed storage system 100 that includes a collection of nodes and storage. System 100 includes two sites, site A 102(1) and site B 102(2), although distributed storage system 100 can be easily expanded to have additional or fewer sites, as desired. Site A 102(1) includes nodes 104(1)-104(N), and site B 102(2)

includes nodes 112. Each of nodes 104(1)-104(N) and/or 112 can be accessed by clients (not shown), such as over a network 110(1) and/or 110(2). Each network 110(1)-110(2) can also include one or more routers, hubs, and/or other network elements (not shown), as desired.

A collection of nodes can form a cluster and communicate to one or more storage devices. Nodes 104(1)-104(N) access storage devices 106(1)-106(M) of the same site (site A 102(1)) and/or storage devices 114(1)-114(P) of another site (site B 102(2)). Similarly, nodes 112 access storage devices 114(1)-114(P) of the same site (site B 102(2)) and/or storage devices 106(1)-106(M) of another site (site A 102(1)). Nodes 104(1)-104(N) and 112 access storage devices 106(1)-106(M) and 114(1)-114(P) to perform various data access operations, such as to read, write, backup, and/or archive data, among others. Nodes 104(1)-104(N) include one or more control modules, such as control module 122. Each such control module manages node operations, such as detection and resolution of reparse point conflicts and/or determining whether to archive or deduplicate files.

Storage devices 106 and/or storage devices 114 can be accessed as a shared storage device, such as a cluster shared volume. For example, storage devices 106(1)-106(M) can be implemented as a collection of hard disk drives aggregated to form at least one volume accessible for read and write operations by nodes 104(1)-104(N) and 112. Nodes can perform I/O reads and writes to storage devices 106 and/or storage devices 114, such as to read and write data. Storage devices store files, such as files 118 and 120.

Nodes of site B 102(2) can be used for providing data protection, archiving, and/or back-up for applications and/or virtual machines of site A 102(1) by using any one of various data protection and/or back-up techniques. Typically, each node 104(1)-104(N) and/or 112 can be implemented using a server, including one or more processors, memory, bus, etc. One example implementation of such a node is described below with reference to FIG. 14. Network 110(1)-110(2) can be implemented as any one or more wired and/or wireless networks, including any combination of a local area network (LAN) a storage area network (SAN), and/or a wide area network (WAN), among others.

A reparse point "links," or "points," from one storage location to another storage location. For example, a reparse point can be implemented as an object that contains data and metadata, including a link (e.g., in the form of an address or other pointer) to a storage location. This storage location can be a file, a block, or another object. A reparse point can be accessed in a similar way that a regular file is accessed. In other words, a file system can perform write or read file operations using a reparse point, where these write or read file operations would access the pointed-to file. However, the reparse point doesn't contain file data, and instead it contains a link to a file that is stored in another local or/remote storage location. As a result, when an operating system or application accesses a reparse point, the access is redirected to the pointed-to location. One example of a reparse point is a shortcut, where an access to such a shortcut accesses the file(s) that are pointed-to by the shortcut. In one implementation, a reparse point can be stored by a stub file, where any access to this stub file is redirected to the location pointed-to by the reparse point's link. To a control module, a reparse point can also appear as a file, and thus the control module can attempt to perform a file operation (such as archiving) on the reparse point (thus resulting in a reparse point conflict).

A reparse point can be generated when files are deduplicated. Deduplication eliminates duplicate copies of identical data within a storage container. Deduplication can be performed, for example, by an operating system (e.g., MICROSOFT WINDOWS 8), to optimize storing of files stored and accessed using that operating system. For example, if file A contains redundant blocks of identical data, the operating system can perform a deduplication operation on this file that would store a single copy of the redundant block at a deduplication store. The deduplication operation also generates a reparse point that points to a location in the deduplication store that stores deduplicated blocks of data for file A.

A reparse point can also be generated when files are archived. For example, one of files stored by storage 106(1) can be archived to storage device 114(1). When a file is archived, the file is moved from its original location in a file system to another location, and the file's original location is associated with the reparse point. A reparse point 124 is created that links reparse point 124 to the archived file on storage 114(1).

The deduplication store and the archiving locations are typically different, they are organized differently, and are used at different times and/or by different modules or operating system. As a result, a reparse point for file A created when deduplicating file A would point to a different location (i.e., a deduplication store) from another reparse point for file A created when archiving file A (which could point to the archived file A).

A reparse point conflict can occur, for example, when a file operation that generates a new reparse point is attempted to be performed on a file that already has an associated reparse point. In some situations, reparse point 124 already exists for file 118, prior to the archive operation being performed. It is noted that to control module 124, such a reparse point can appear as another file.

In this case, before the archive operation is performed, reparse point 124 already links to deduplicated file blocks. When the control module receives a request to archive file 118, a reparse point conflict occurs (as an operating system only uses one reparse point per file at a time). Upon detection of the reparse point conflict, control module 122 resolves the reparse point conflict, as described below with reference to various embodiments. After the reparse conflict is resolved, file 118 is archived, and the archived file can be accessed using a new or modified reparse point.

Figure 2:
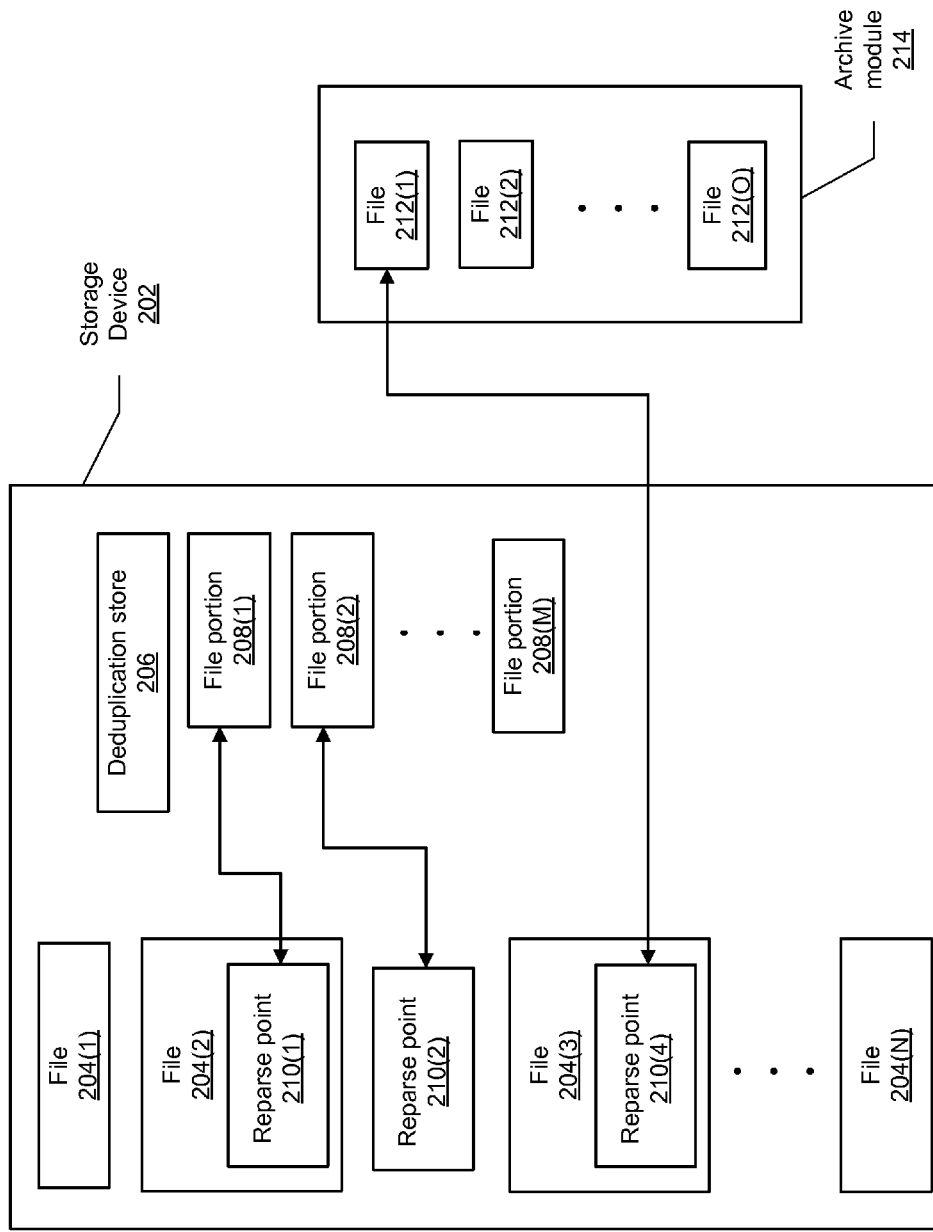
FIG. 2 is a block diagram illustrating an example use of reparse points, according to one embodiment.

FIG. 2 is a block diagram 200 illustrating example use of reparse points, according to one embodiment. A storage device 200 (which can implement storage 106(1)) can include files 204(1)-204(N) (referred to collectively as files 204) as well as reparse points 210(1)-210(3). Each one of these files can be stored using one or more blocks. For example, file 204(1) can be stored using blocks A-D. Storage device 202 can also include a deduplication store 206 that can store file portions 208-208(M). Deduplication store 206 includes file portions of files 204 that are deduplicated, such as by the operating system. For example, file 204(2) can be deduplicated, and reparse point 210(1) is used (e.g., by the operating system) to point to deduplicated file portion 208(1) of deduplication store 206. In this case, file 204(2) may only contain the reparse point and not original data (that is now stored using the deduplication store), and thus can be referred to as a stub file. Another one of files 204 can be deduplicated, and reparse point 210(2) is used to point to deduplicated file portion 208(2) of deduplication store 206. However, reparse point 210(2) can be implemented as a stand-alone file object, i.e., without a stub file.

Reparse points can be also used (e.g., by an operating system of a node accessing storage device 202, and/or by a control module) to access archived files, such as one or more of archived files 212(1)-212(O) stored using archive module 214. As part of this archiving operations, file 204(3) contents in the original location in storage device 202 are deleted and replaced with the reparse point's content, which include a pointer to archived file 212(1) (i.e., the archived copy of the original file). For example, file 204(3) can be archived for storage using archive module 214. Once original file 204(3) is archived, reparse point 210(3) links to archived file 212(1), and file 204(3) (containing the reparse point) can be referred to as a stub file. Any access to file 204(3) would access the linked-to file 212(1) stored using archive module 214.

Figure 3:
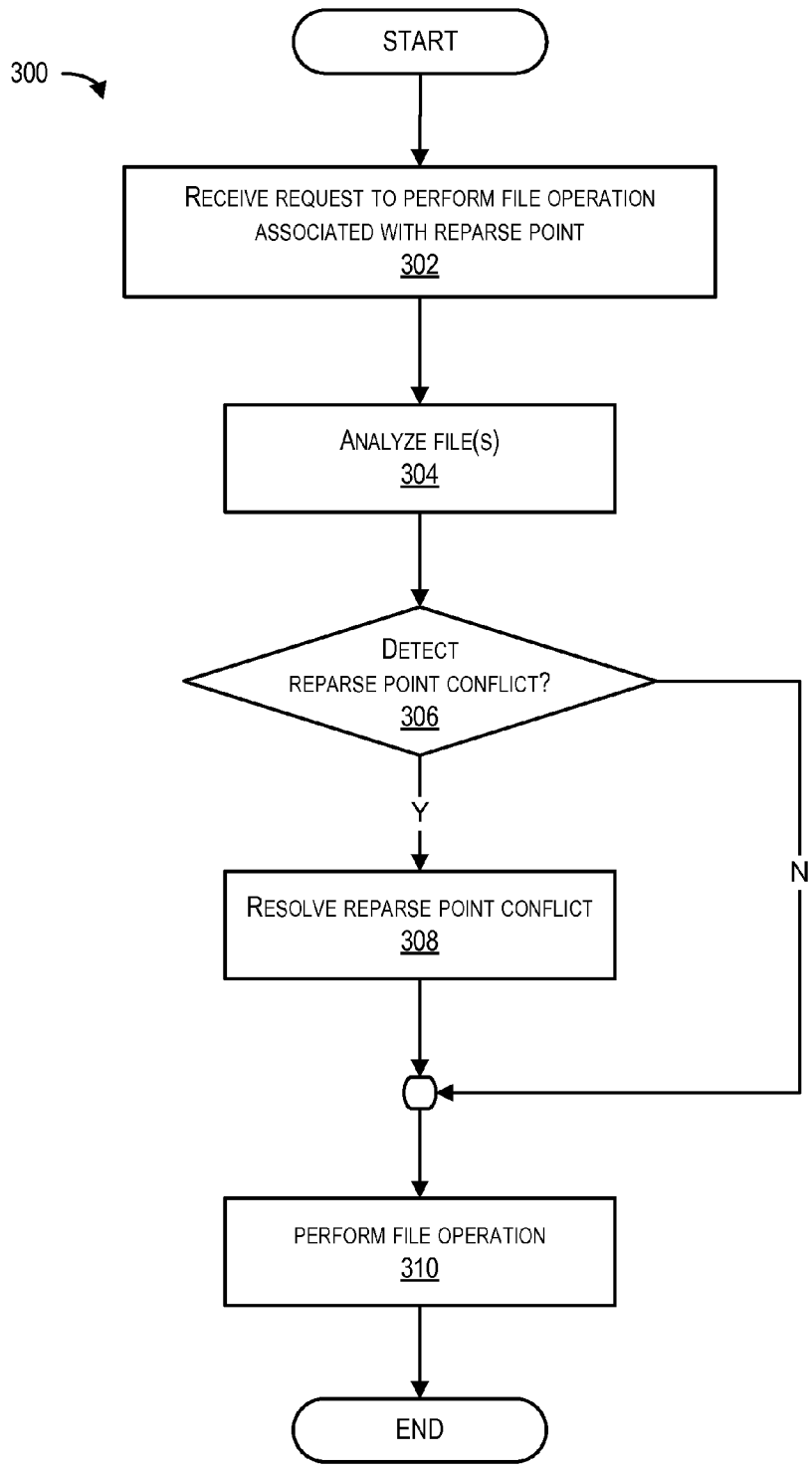
FIG. 3 is a flowchart of a method illustrating detecting and resolving a reparse point conflict, according to some embodiments.

FIG. 3 illustrates a method 300 for detecting and resolving a reparse point conflict, according to some embodiments. This method may be modified in order to derive alternative embodiments. Also, some operations in this embodiment are shown in sequential order. However, certain operations may occur in a different order than shown, certain operations may be performed concurrently, additional operations, not currently shown in FIG. 3 may be added, certain operations may be combined with other operations, and certain operations may be absent (or replaced with other operations that are not shown in FIG. 3) in another embodiment. Method 300 is described with reference to variations of the elements described in connection with FIG. 1. In one embodiment, at least portions of method 300 are executed by the nodes of FIG. 1, such as by control module 122.

In element 302, a control module receives a request to perform a file operation associated with a reparse point. For example, control module 122 receives a request to archive (or perform another file operation on) file 204(2). This file operation creates a new (or modifies an existing) reparse point. For example, an archive operation typically moves a file from an originating location to the archived location, and generates a reparse point in the originating location.

In element 304, the control module analyzes file(s) associated with the requested file operation. Control module 122 can analyze for the file(s) (e.g., file 204(2)) for various purposes, such as to determine whether the file is a deduplication candidate, to identify whether a reparse point already exists for each of the file(s), and to determine whether a reparse point conflict will occur when the requested operation is performed. In one implementation, control module 122 analyzes the file(s) based on the requested file operation. These and other techniques of analyzing file(s) are described with reference to the embodiments of FIGS. 3-7.

In element 306, the control module detects whether there is a reparse point conflict, according to one embodiment. For example, control module 122 detects, prior to the requested file operation being performed, whether there is a potential conflict between a potential new reparse point that is typically generated when this file operation is performed and an existing reparse point. In this situation, the conflict occurs since file 204(2) is already associated with existing reparse point 210(1) prior to element 306 being performed. However, other reasons for existence of the existing reparse point are possible. If the control module detects a reparse point conflict, element 308 is performed. Otherwise, if the control module does not detect a reparse point conflict, element 310 is performed.

In element 308, the control module resolves the reparse point conflict, according to some embodiments. For example, control module 122 can delete the existing reparse point and create a new reparse point that is associated with the requested file operation. In another example, control module 122 can use the existing reparse point with new information that is associated with the requested file operation. These and other techniques of resolving the reparse point conflict are described with reference to the embodiments of FIGS. 4-8. In one embodiment, the control module determines which one of techniques of resolving the reparse point conflict to use, e.g., based on the type of the file operation. In yet another embodiment, the control module determines to not to perform the file operation, thus not deleting or modifying the existing reparse point.

In element 310, the control module performs the requested file operation, according to one embodiment. The file operation is performed either by modifying the existing reparse point or by deleting the existing reparse point and creating a new reparse point, as determined by elements 304 and 306 above.

Figure 4:
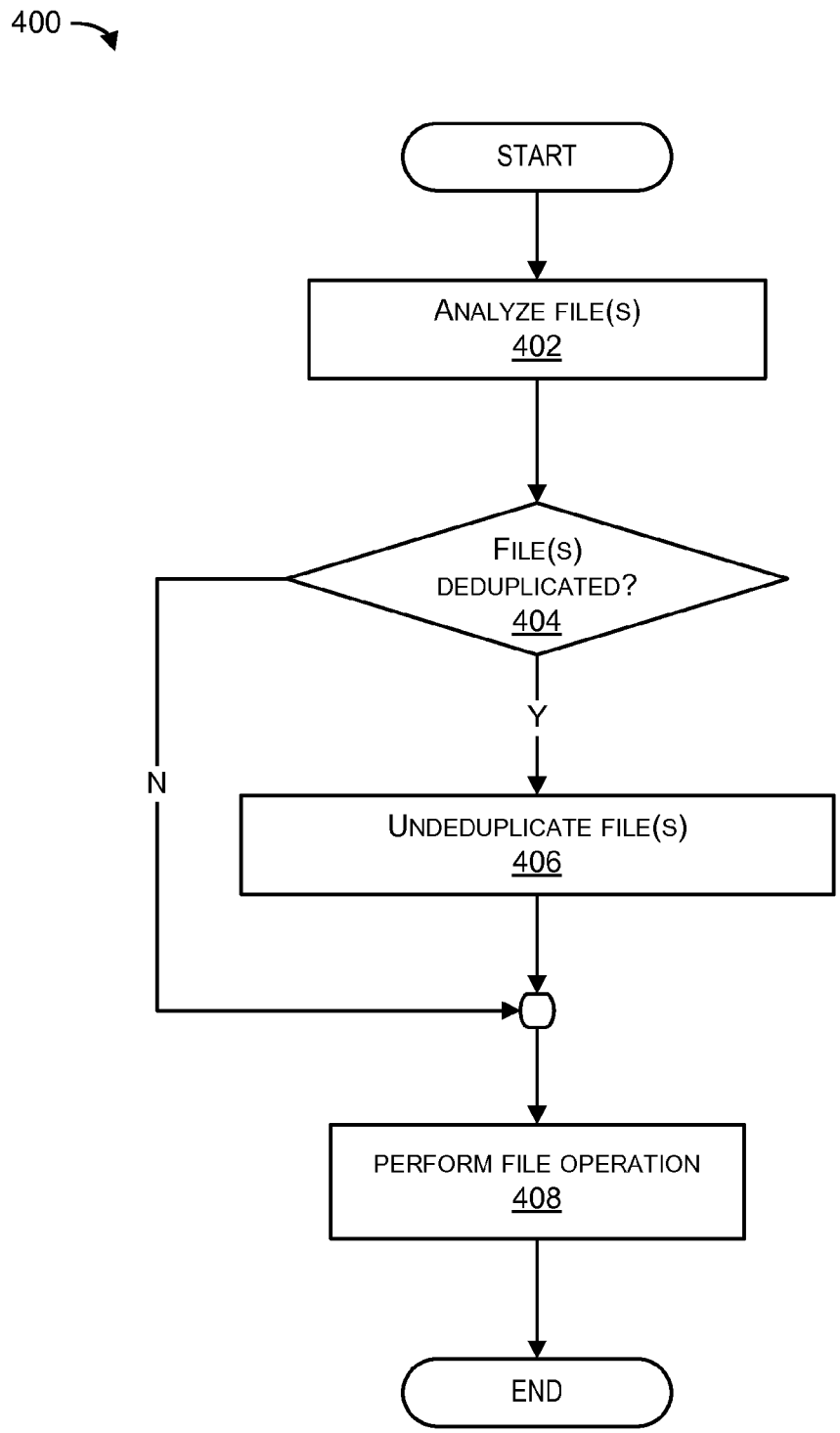
FIG. 4 is a flowchart of a method illustrating file undeduplication, according to some embodiments.

FIG. 4 illustrates a method 400 associated with resolving a reparse point conflict, particularly in the context of reparse points associated with deduplicated files, according to one embodiment. This method may be modified in order to derive alternative embodiments. Also, some operations in these embodiments are shown in sequential order. However, certain operations may occur in a different order than shown, certain operations may be performed concurrently, certain operations may be combined with other operations, and certain operations may be absent in another embodiment. Method 400 is described with reference to variations of the elements described in connection with FIGS. 1 and 2. In one embodiment, at least portions of method 400 are executed by the nodes of FIG. 1, such as by control module 122.

In element 402, a control module analyzes file(s) associated with the requested file operation. Control module 122 analyzes the file(s) for purposes of identifying whether each of the file(s) has already been deduplicated, determining whether each of the file(s) is associated with existing reparse points, and/or identifying whether the requested file operation involves manipulation of a reparse point. For example, if the requested file operation includes a shortcut creation on file 204(2), the shortcut creation typically creates a new reparse point that would point to an archived version of file 204(2) (e.g., as described with reference to FIG. 2).

In element 404, the control module detects whether the file is deduplicated. For example, the control module determines whether file 204(2) has been deduplicated. As explained above, if there is an existing reparse point for a file, and if the requested file operation also needs to manipulate a reparse point for the file, then a reparse point conflict between the prior operation that created the existing reparse point (the deduplication operation, in this scenario) and the current requested operation can occur. In this example, since file 204(2) has been deduplicated prior to the requested file operation being performed on that file, then there is an existing reparse point (i.e., reparse point 210(1)) for file 204(2). As such, if the control module detects that the file is deduplicated, element 406 is performed. Otherwise, if the control module does not detect that the file is deduplicated, element 408 is performed.

In element 406, the control module undeduplicates the file(s), using one of various techniques, to generate undeduplicated file(s). By doing so, a reparse point associated with the deduplicated file is removed, e.g., by an operating system that performs the deduplication/undeduplication file operations. In one embodiment, the control module can directly undeduplicate such file(s) (e.g., file 204(2)) by creating a copy of the file on storage device 202. In one embodiment, the control module can communicate with an operating system, such as by communicating undeduplicate file 204(2) commands to the operating system. In either embodiment, once the file is undeduplicated, the reparse point is no longer needed, since the undeduplicated file can be referenced directly without using a link to the deduplication store. In one implementation, an undeduplicated file is substantially similar to a file that has not been deduplicated. Other implementations of undeduplicating files are also contemplated. For example, once file 204(2) is undeduplicated, file 204(2) would no longer include reparse point 210(1), and any data pointed to by reparse point 210(1) (before reparse point 210(1) was deleted) would be included by file 204(2).

In element 408, the control module performs the requested file operation. The file operation can generate a new reparse point. For example, if the requested operation includes a shortcut operation on a file, control module 122 creates a shortcut on this file, whereas shortcut creation typically generates a new reparse point. Once file 204(2) is archived, reparse point 210(1) would point to file 212(2) as stored using archive module 214.

Figure 5:
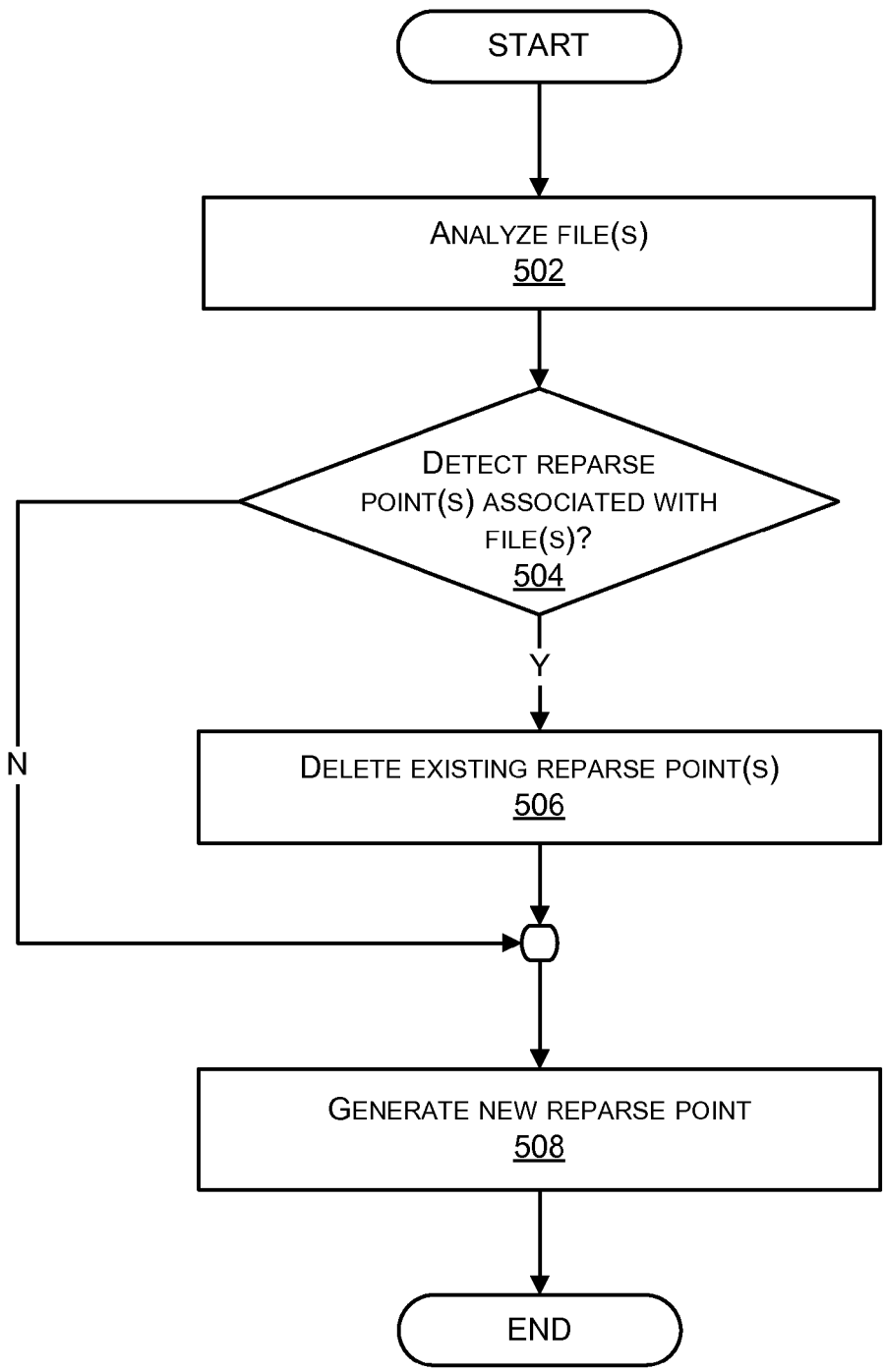
FIGS. 5-8 are flowcharts of methods illustrating various ways of detecting and resolving reparse point conflicts, according to some embodiments.

FIG. 5 illustrates a method 500 associated with resolving a reparse point conflict, and particularly with deleting an existing reparse point if such a conflict exists, according to one embodiment. This method may be modified in order to derive alternative embodiments. Also, some operations in these embodiments are shown in sequential order. However, certain operations may occur in a different order than shown, certain operations may be performed concurrently, certain operations may be combined with other operations, and certain operations may be absent in another embodiment. Method 500 is described with reference to variations of the elements described in connection with FIGS. 1 and 2. In one embodiment, at least portions of method 500 is executed by the nodes of FIG. 1, such as by control module 122. In one embodiment, method 400 implements elements 304-310 of method 300.

In element 502, a control module analyzes file(s) associated with the requested file operation. Control module 122 analyzes the file(s) for purposes of identifying whether each of the file(s) has already been deduplicated, determining whether each of the file(s) is associated with existing reparse points, and/or identifying whether the requested file operation involves manipulation of a reparse point. For example, if the requested file operation includes a shortcut creation on file 204(2), the shortcut creation typically creates a new reparse point that would point to an archived version of file 204(2) (e.g., as described with reference to FIG. 2).

In element 504, the control module detects whether there is a reparse point already associated with the file on which the requested file operation is to be performed, according to one embodiment. In this example, since file 204(2) has been deduplicated prior to the requested file operation being performed on that file, then there is an existing reparse point (i.e., reparse point 210(1)) for file 204(2). As such, if the control module detects a reparse point conflict, element 506 is performed. Otherwise, if the control module does not detect a reparse point conflict, element 508 is performed.

In element 506, the control module deletes the existing reparse point, according to one embodiment. The reparse point can be deleted, for example, by undeduplicating a file if the file is deduplicated. The control module can also issue commands to an operating system to delete this reparse point.

In element 508, the control module generates a new reparse point, according to one embodiment. The new reparse point can be generated as a part of the control module performing the requested file operation.

Figure 6:
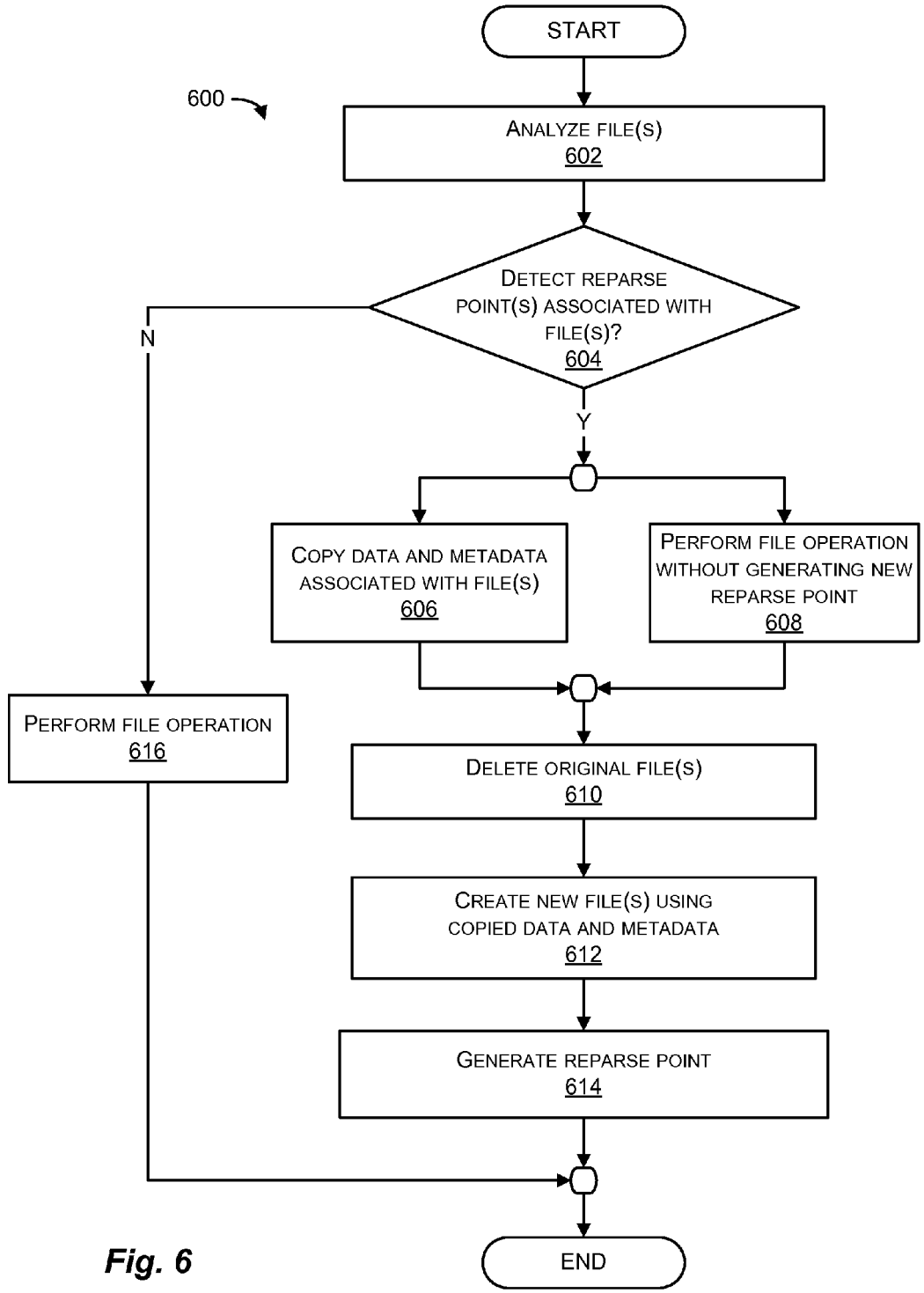

FIG. 6 illustrates a method 600 associated with resolving a reparse point conflict, and particularly with deleting an existing reparse point if such a conflict exists, according to one embodiment. This method may be modified in order to derive alternative embodiments. Also, some operations in these embodiments are shown in sequential order. However, certain operations may occur in a different order than shown, certain operations may be performed concurrently, certain operations may be combined with other operations, and certain operations may be absent in another embodiment. Method 600 is described with reference to variations of the elements described in connection with FIGS. 1 and 2. In one embodiment, at least portions of method 600 are executed by the nodes of FIG. 1, such as by control module 122. In one embodiment, method 600 implements elements 304-310 of method 300.

In element 602, a control module analyzes file(s) associated with the requested file operation. Control module 122 analyzes the file(s) for purposes of identifying whether each of the file(s) has already been deduplicated, determining whether each of the file(s) is associated with existing reparse points, and/or identifying whether the requested file operation involves manipulation of a reparse point. For example, if the requested file operation includes a shortcut creation on file 204(2), the shortcut creation typically creates a new reparse point that would point to an archived version of file 204(2) (e.g., as described with reference to FIG. 2).

In element 604, the control module detects whether there is a reparse point already associated with the file on which the requested file operation is to be performed. In this example, since file 204(2) has been deduplicated prior to the requested file operation being performed on that file, then there is an existing reparse point (i.e., reparse point 210(1)) for file 204(2). As such, if the control module detects a reparse point conflict, elements 606 and 608 are performed. Otherwise, if the control module does not detect a reparse point conflict, element 616 is performed.

In element 606, the control module copies data and metadata associated with the file(s). For example, control module 122 can copy any data and metadata that is associated with file 204(2). In one embodiment, if file 204(2) is archived, control module 122 copies deduplicated data (i.e., file portion 208(1)) and any metadata associated with file 204(2) into a temporary file.

In element 608, the control module performs the file operation without generating a new reparse point. For example, control module 122 performs a portion of the archiving file operation on file 204(2), but without generating a new reparse point.

In element 610, the control module deletes the original file. For example, control module 122 deletes file 204(2). Deletion of file 204(2) typically also deletes reparse point 210(1). In one embodiment, both elements 606 and 608 are performed prior to element 610 being performed.

In element 612, the control module creates new file(s) using the copied data and metadata (i.e., from the temporary file), according to one embodiment. In one implementation, the control module simply renames the temporary file using the name of the now-deleted file 204(2). In element 614, the control module generates a new reparse point that is associated with the new file, according to one embodiment. If the file was archived in element 608, then the control module associates the new reparse point with the archived file. In element 616, the control module performs the file operation.

Figure 7:
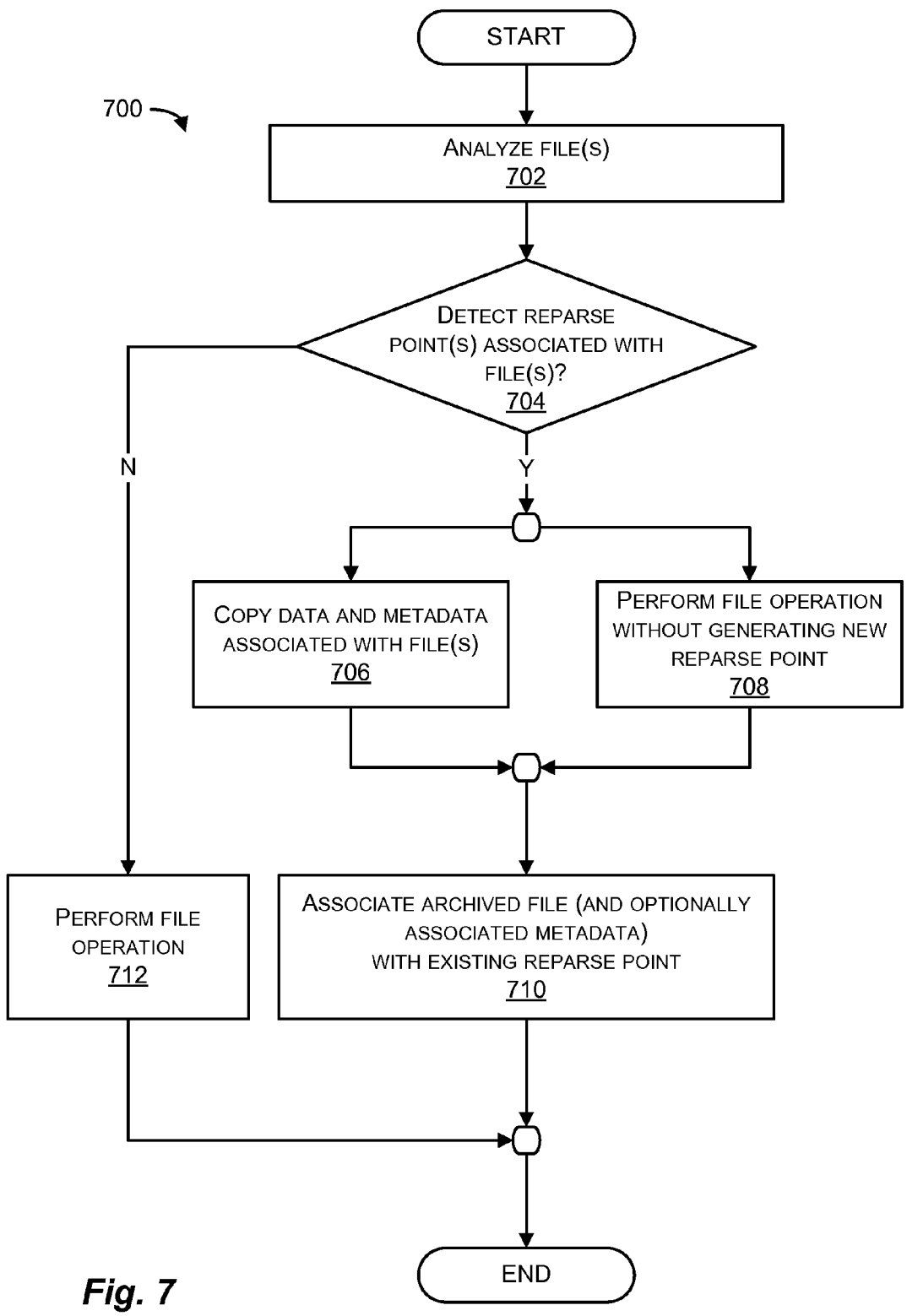

FIG. 7 illustrates a method 700 associated with resolving a reparse point conflict, and particularly with using an existing reparse point if such a conflict exists, according to one embodiment. This method may be modified in order to derive alternative embodiments. Also, some operations in these embodiments are shown in sequential order. However, certain operations may occur in a different order than shown, certain operations may be performed concurrently, certain operations may be combined with other operations, and certain operations may be absent in another embodiment. Method 700 is described with reference to variations of the elements described in connection with FIGS. 1 and 2. In one embodiment, at least portions of method 700 are executed by the nodes of FIG. 1, such as by control module 122. In one embodiment, method 700 implements elements 304-310 of method 300.

In element 702, a control module analyzes file(s) associated with the requested file operation. Control module 122 analyzes the file(s) for purposes of identifying whether each of the file(s) has already been deduplicated, determining whether each of the file(s) is associated with existing reparse points, and/or identifying whether the requested file operation involves manipulation of a reparse point. For example, if the requested file operation includes a shortcut creation on file 204(2), the shortcut creation typically creates a new reparse point that would point to an archived version of file 204(2) (e.g., as described with reference to FIG. 2).

In element 704, the control module detects whether there is a reparse point already associated with the file on which the requested file operation is to be performed. In this example, since file 204(2) has been deduplicated prior to the requested file operation being performed on that file, then there is an existing reparse point (i.e., reparse point 210(1)) for file 204(2). If the control module detects a reparse point conflict, elements 706 and 708 are performed. Otherwise, if the control module does not detect a reparse point conflict, element 712 is performed.

In element 706, the control module copies data and metadata associated with the file(s). For example, control module 122 can copy any data and metadata that is associated with file 204(2). In one embodiment, if file 204(2) is archived, control module 122 copies deduplicated data (i.e., file portion 208(1)) and any metadata associated with file 204(2) into a temporary file.

In element 708, the control module performs the file operation without generating a new reparse point. For example, control module 122 performs a portion of the archiving file operation on file 204(2), but without generating a new reparse point In element 710, the control module associates the archived file, and optionally the associated metadata, with the existing reparse point, according to one embodiment. As a result, the file operation, e.g., shortcut creation, is associated with the reparse point that already exists prior to element 704 being performed.

In element 712, the control module performs the requested file operation on the file, which includes generating a new reparse point for the file.

Figure 8:
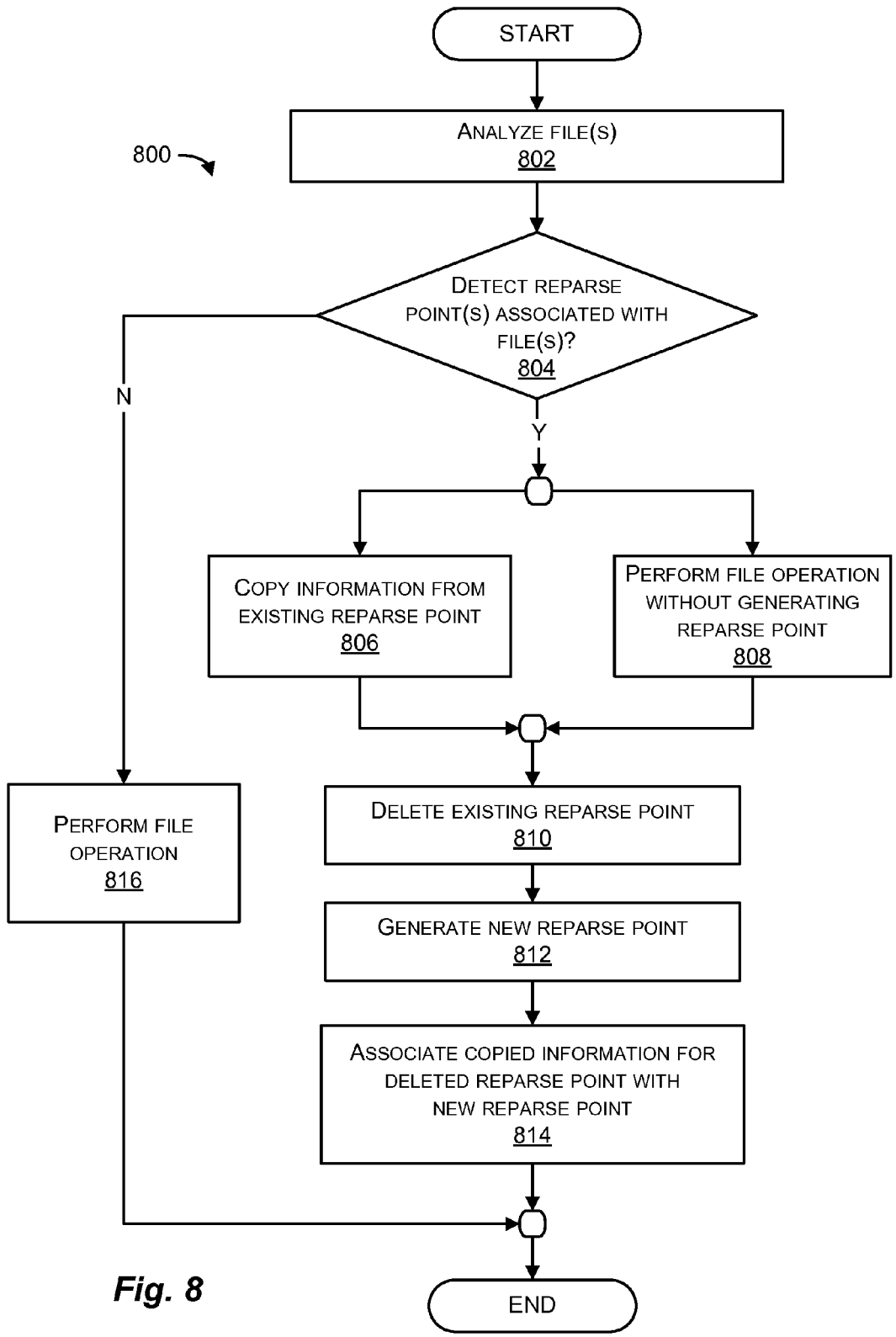

FIG. 8 illustrates a method 800 associated with resolving a reparse point conflict, and particularly with deleting an existing reparse point if such a conflict exists, according to one embodiment. This method may be modified in order to derive alternative embodiments. Also, some operations in these embodiments are shown in sequential order. However, certain operations may occur in a different order than shown, certain operations may be performed concurrently, certain operations may be combined with other operations, and certain operations may be absent in another embodiment. Method 800 is described with reference to variations of the elements described in connection with FIGS. 1 and 2. In one embodiment, at least portions of method 800 are executed by the nodes of FIG. 1, such as by control module 122. In one embodiment, method 800 implements elements 304-310 of method 300.

In element 802, a control module analyzes file(s) associated with a requested file operation, according to one or more embodiments. Control module 122 analyzes the file(s) for purposes of identifying whether each of the file(s) has already been deduplicated, determining whether each of the file(s) is associated with existing reparse points, and/or identifying whether the requested file operation involves manipulation of a reparse point. For example, if the requested file operation includes a shortcut creation on file 204(2), the shortcut creation typically creates a new reparse point that would point to an archived version of file 204(2) (e.g., as described with reference to FIG. 2).

In element 804, the control module detects whether there is a reparse point already associated with the file on which the requested file operation is to be performed. In this example, since file 204(2) has been deduplicated prior to the requested file operation being performed on that file, then there is an existing reparse point (i.e., reparse point 210(1)) for file 204(2). If the control module detects a reparse point conflict, elements 706 and 708 are performed. Otherwise, if the control module does not detect a reparse point conflict, element 716 is performed.

In element 806, the control module copies information associated with the existing reparse point, according to one embodiment. For example, control module 122 can copy information, e.g., any data/metadata, associated with the existing reparse point. This copied information can be saved by the control module, e.g., using node's memory.

In element 808, the control module performs the file operation without generating a new reparse point, according to one embodiment. For example, control module 122 can perform a portion of a shortcut file operation on file 204(2), but without generating a new reparse point. In element 810, the control module deletes the existing reparse point. Although any information associated with this existing reparse point is also deleted, the control module has access to the copied reparse point information (as copied in element 706), such as saved using node's memory.

In element 812, the control module generates a new reparse point. For example, this new reparse point can be a reparse point that is typically generated by the file operation of element 708. In element 814, the control module associates the copied information with this new reparse point, according to one embodiment. As a result, the file operation is associated with a new reparse point.

In element 816, the control module performs the requested file operation on the file, which includes generating a new reparse point for the file.

Figure 9:
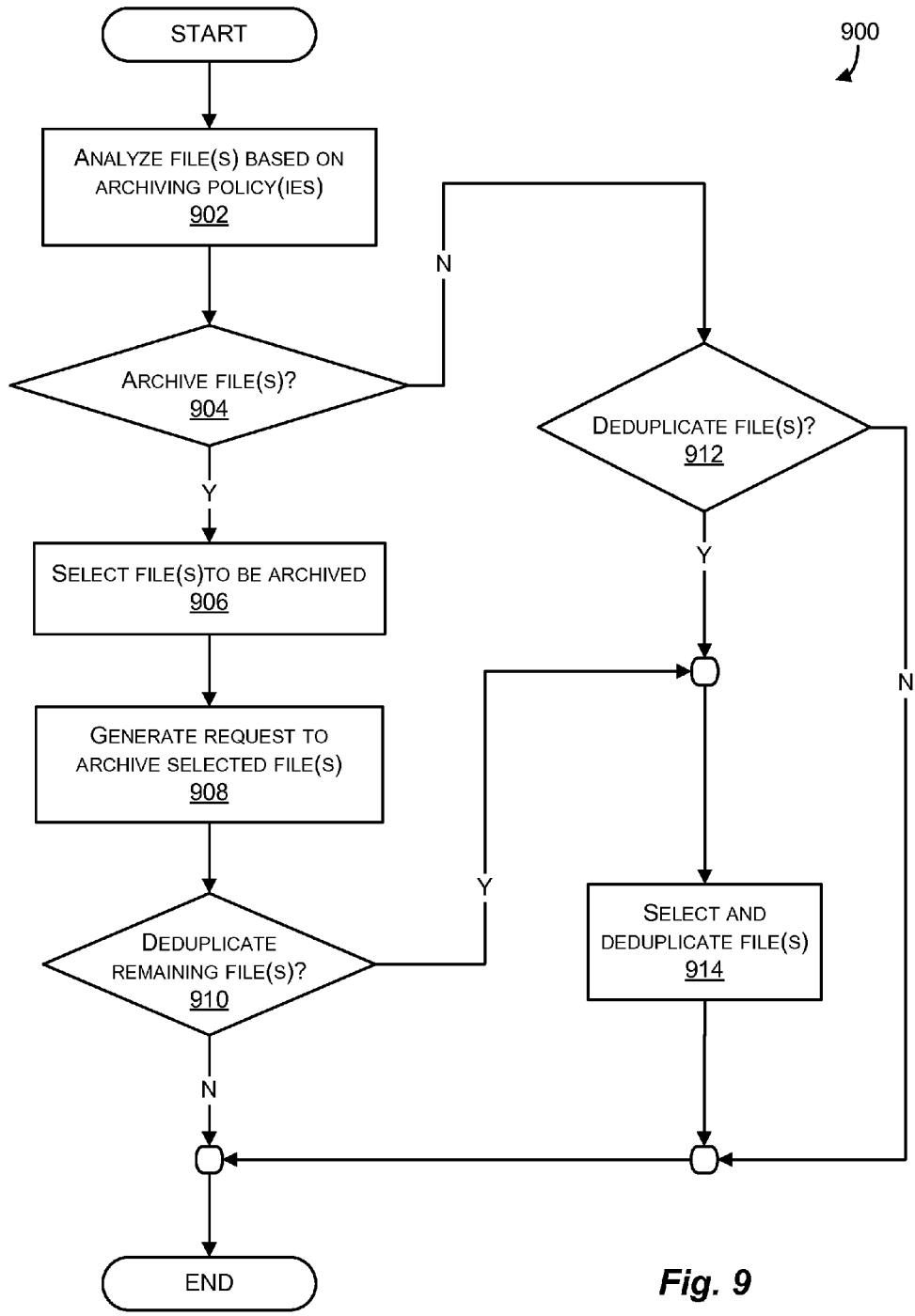
FIG. 9 is a flowchart of a method illustrating determining whether to archive and/or deduplicate files, according to some embodiments.

FIG. 9 is a flowchart of method 900 illustrating determining whether to archive and/or deduplicate certain files, according to some embodiments. This method may be modified in order to derive alternative embodiments. Also, some operations in this embodiment are shown in sequential order. However, certain operations may occur in a different order than shown, certain operations may be performed concurrently, certain operations may be combined with other operations, and certain operations may be absent in another embodiment. Method 900 is described with reference to variations of the elements described in connection with FIG. 1. In one embodiment, at least portions of method 900 are executed by the nodes of FIG. 1, such as by control module 122. In some embodiments, method 900 is performed prior to method 300 being performed.

In element 902, a control module analyzes file(s) based on archival policy(ies), according to some embodiments. For example, control module 122 accesses and analyzes certain files based on archiving policies. The archival policies can be implemented as metadata associated with a particular user, computing system, storage device, set of files, etc., that indicates how an archival application should handle data, such as by indicating the circumstances under which such data should be archived, the amount of time that such data should remain in archival storage, and the like. The archival policies can be provided or selected by a user and/or administrator. Example archiving policies are described below, with reference to FIGS. 10-12.

In element 904, the control module determines whether to archive one or more of the files, according to one embodiment. The control module makes this determination based on element 902. If the control module determines to archive one or more of the files, element 906 is performed. If the control module determines not to archive one or more of the files, element 912 can be performed.

In element 906, the control module selects files to be archived, according to some embodiments. This determination can be based on element 902. In element 908, the control module generates a request to archive the selected files, according to some embodiments. In one implementation, in element 908, the control module simply archives the selected files.

In element 910, the control module determines whether to deduplicate the remaining files, according to some embodiments. The control module makes this determination based on element 902. In one implementation, the analysis of element 902 can be redone for any remaining files, e.g., files that have not been archived. If the control module determines to deduplicate one or more of the remaining files, element 914 is performed. If the control module determines not to deduplicate one or more of the remaining files, method 900 ends.

In element 912, the control module determines whether to deduplicate one or more of the files, according to one embodiment. The control module makes this determination based on element 902. If the control module determines to deduplicate one or more of the files, element 914 is performed. If the control module determines not to deduplicate one or more of the files, method 900 ends. It is noted that method 900 can be repeated at regular or otherwise prespecified intervals, on an ongoing basis, and/or another schedule.

In element 914, the control module selects files to be deduplicated, according to some embodiments. The control module also deduplicates the selected files, such as by generating a request to the OS to deduplicate these files, according to some embodiments.

Figure 10:
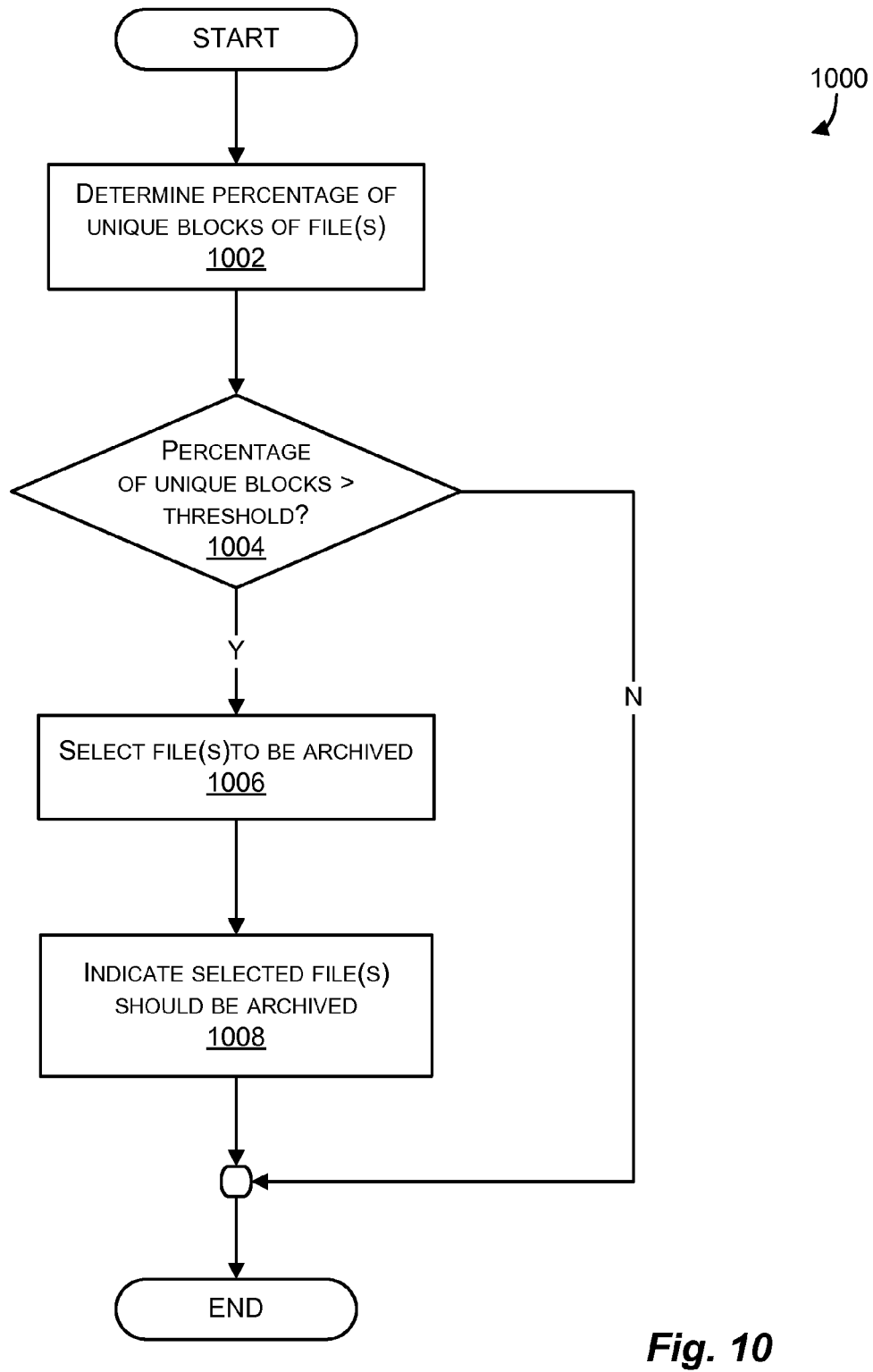
FIGS. 10-12 are flowcharts of methods illustrating various ways of determining whether files should be archived, according to some embodiments.
Figure 11:
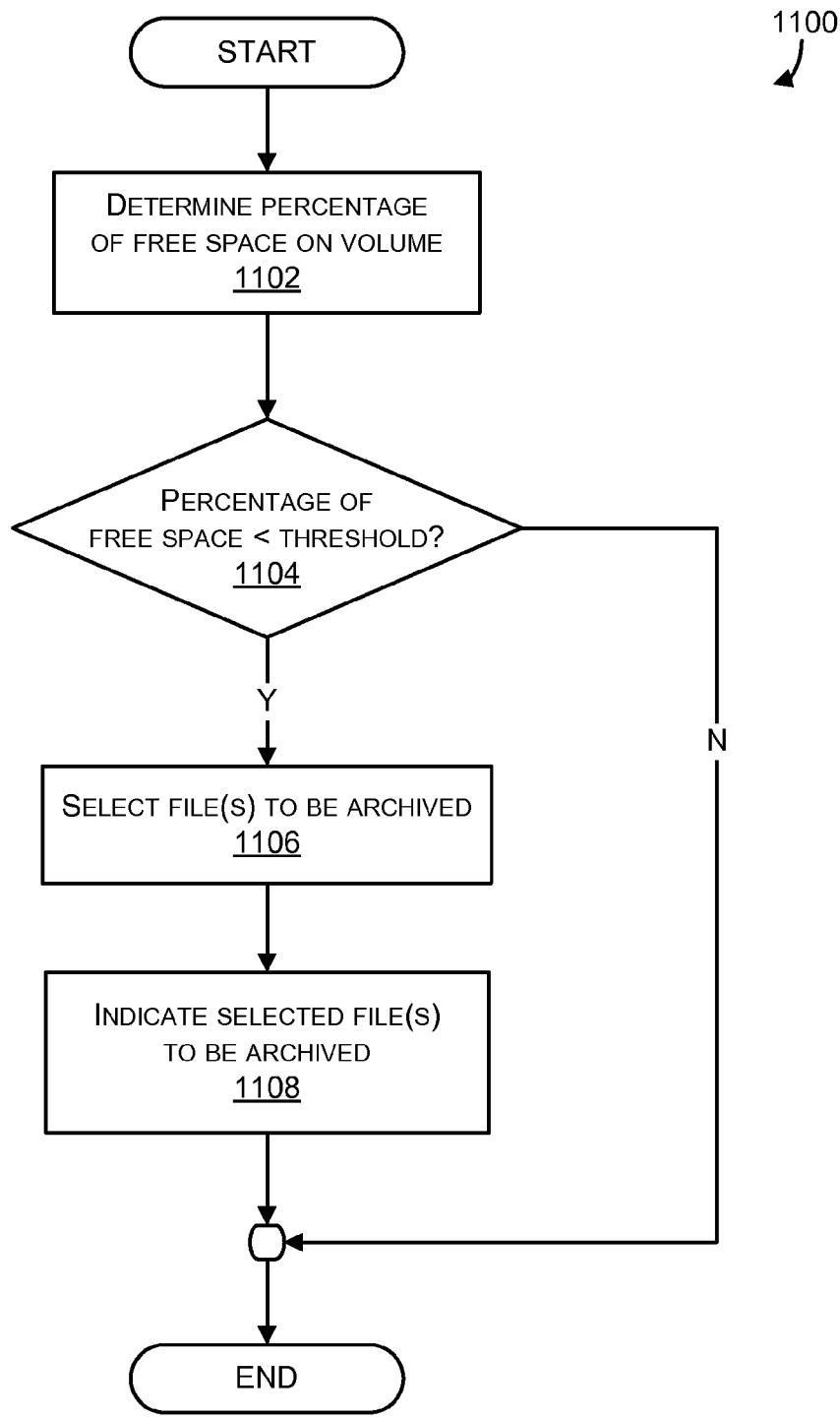
Figure 12:
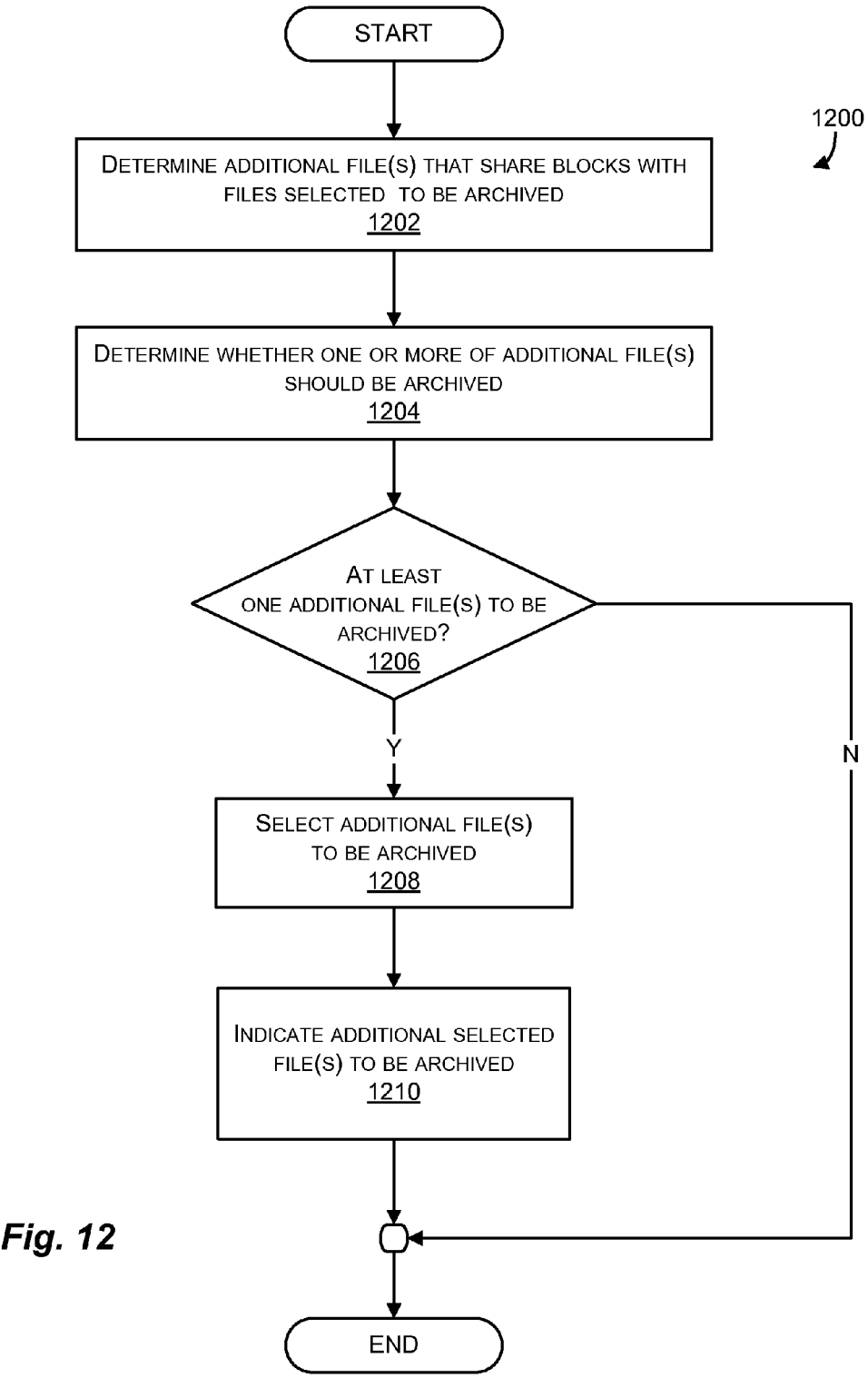

FIGS. 10-12 are flowcharts of methods illustrating various ways of determining whether files should be archived, according to some embodiments. In some embodiments, methods of FIGS. 10-12 are performed prior to method 200 being performed.

FIG. 10 is a flowchart of method 1000 illustrating one of many archival policies that can be used by the control module to determine whether to archive and/or deduplicate certain files, according to some embodiments. This method may be modified in order to derive alternative embodiments. Also, some operations in this embodiment are shown in sequential order. However, certain operations may occur in a different order than shown, certain operations may be performed concurrently, certain operations may be combined with other operations, and certain operations may be absent in another embodiment. Method 1000 is described with reference to variations of the elements described in connection with FIG. 1. In one embodiment, at least portions of method 1000 are executed by the nodes of FIG. 1, such as by control module 122. In some embodiments, method 1000 implements element 906 of method 900.

In element 1002, a control module 122 determines the percentage of unique blocks of a file. In some implementations, each such file can be stored using multiple blocks. For example, file A is distributed among four blocks. Block A can store a portion of file A and a portion of file B. Similarly, block B can store a portion of file B and file C, and blocks C and D can store a portion of file A only (i.e., do not store portions of any other files). In this case, the percentage of unique blocks of file A is 50%, i.e., out of four blocks A-D, two blocks (blocks C and D) are unique. It is noted that the control module can perform method 1000 for each of the files accessible by the control module, e.g., files A-C. In one embodiment, element 1002 is performed for each of files accessible by the control module.

In element 1004, the control module determines whether percentage of unique blocks is greater than a certain threshold, according to one embodiment. The control module can determine whether some unique block percentage (as determined in element 1002) is greater than a threshold. For example, if the threshold is set to 30%, then files that contain 30% or more of their data from unique blocks would be archived. This threshold can be determined off-line, or it may be calculated during execution of various applications and programs. For example, the threshold can be recalculated based on the number of storage devices available to each node/control module, network bandwidth, among others. If the control module determines the unique block percentage is greater than the certain threshold, element 1006 is performed. If the control module determines that the unique block percentage is not greater than this threshold, method 1000 ends.

In element 1006, the control module selects file(s) to be archived, according to one embodiment. For example, the control module selects file A to be archived. It is noted that in some embodiments, the control module can select both files A and B if elements 1002 and 1004 were performed for multiple files. In element 1008, the control module indicates that the selected file(s) are to be archived, according to one embodiment. For example, this indication can then be used by the control module (e.g., during performance of element 906).

FIG. 11 is a flowchart of method 1100 illustrating one of many archival policies that can be used by the control module to determine whether to archive and/or deduplicate certain files, according to some embodiments. This method may be modified in order to derive alternative embodiments. Also, some operations in this embodiment are shown in sequential order. However, certain operations may occur in a different order than shown, certain operations may be performed concurrently, certain operations may be combined with other operations, and certain operations may be absent in another embodiment. Method 1100 is described with reference to variations of the elements described in connection with FIG. 1. In one embodiment, at least portions of method 900 are executed by the nodes of FIG. 1, such as by control module 122. In some embodiments, method 1100 implements element 906 of method 900.

In element 1102, a control module additionally determines percentage of free space on a volume, according to one embodiment. A volume is a logical construct that indicates data that is stored and accessed by various nodes. An example volume is described above with reference to FIG. 1. For example, a volume can be implemented using storage devices 106(1)-106(M). For example, file A is distributed among four blocks (i.e., blocks A-D), all of which are stored using a certain volume.

In element 1104, the control module determines whether percentage of free space is less than a certain threshold, according to one embodiment. For example, the control module determines whether some unique free space percentage (as determined by element 1102) is less than a threshold. This threshold can be determined off-line, it may be recalculated during execution of various applications and programs on the control module. For example, the threshold can be recalculated based on addition, removal, and/or reconfiguration of storage devices (i.e., that make up the certain volume) available to each node/control module. In other words, the control module uses a volume based policy that specifies that if the free space on a volume reaches a certain limit, only then the archiving process will be triggered. If the control module determines the free space percentage is less than the certain threshold, element 1106 is performed. If the control module determines that the free space percentage is not less than this threshold, method 1100 ends.

In element 1106, the control module selects file(s) to be archived, according to one embodiment. For example, the control module selects one or more of files A-D that are stored on the volume that is determined to have less free space than the threshold. The control module can select the file(s) based on a variety of techniques, such as least frequently used file(s), most fragmented file(s), oldest file(s), longest time elapsed since being used, largest file(s), file priority, and/or other techniques/factors. In element 1108, the control module indicates that the selected file(s) are to be archived, according to one embodiment. For example, this indication can then be used by the control module in element 906.

FIG. 12 is a flowchart of method 1200 illustrating determining whether to archive and/or deduplicate certain files, according to some embodiments. This method may be modified in order to derive alternative embodiments. Also, some operations in this embodiment are shown in sequential order. However, certain operations may occur in a different order than shown, certain operations may be performed concurrently, certain operations may be combined with other operations, and certain operations may be absent in another embodiment. Method 1200 is described with reference to variations of the elements described in connection with FIG. 1. In one embodiment, at least portions of method 1200 are executed by the nodes of FIG. 1, such as by control module 122. In some embodiments, method 1200 implements a portion of element 906 of method 900, such as when method 1200 is performed after performance of method 900 and/or method 1000.

In element 1202, a control module determines whether there are additional file(s) that share block(s) with file(s) selected for archiving, according to one embodiment. According to the example given above with reference to FIG. 10, if out of files A-C, file A is selected for archiving (e.g., using method 900), the control module can also determine that file B shares blocks (i.e., block A) with file A.

In element 1204, the control module determines whether to archive one or more of these additional files, according to one embodiment. This determination can be similar to that described with reference to methods 900 and 1000. For example, the control module can determines percentage of unique blocks of a file. The control module can then determine whether percentage of unique blocks is greater than a second threshold. This second threshold can also be determined off-line, or it can be recalculated during execution of the control module. Typically, this second threshold is different from the threshold of method 900. In other words, the control module uses a policy that determines if any additional files should be archived.

In element 1206, the control module determines whether there is at least one additional file to be archived, according to one embodiment. This determination is based on element 1204. If the control module determines that there is at least one additional file to be archived, element 1208 is performed.

If the control module determines that there are no additional file(s) to be archived, method 1200 ends.

In element 1208, the control module selects additional file(s) to be archived, according to one embodiment. For example, the control module selects file B to be archived. In element 1210, the control module indicates that the selected additional file(s) are to be archived, according to one embodiment. For example, this indication can then be used by the control module (e.g., during performance of element 906).

Figure 13:
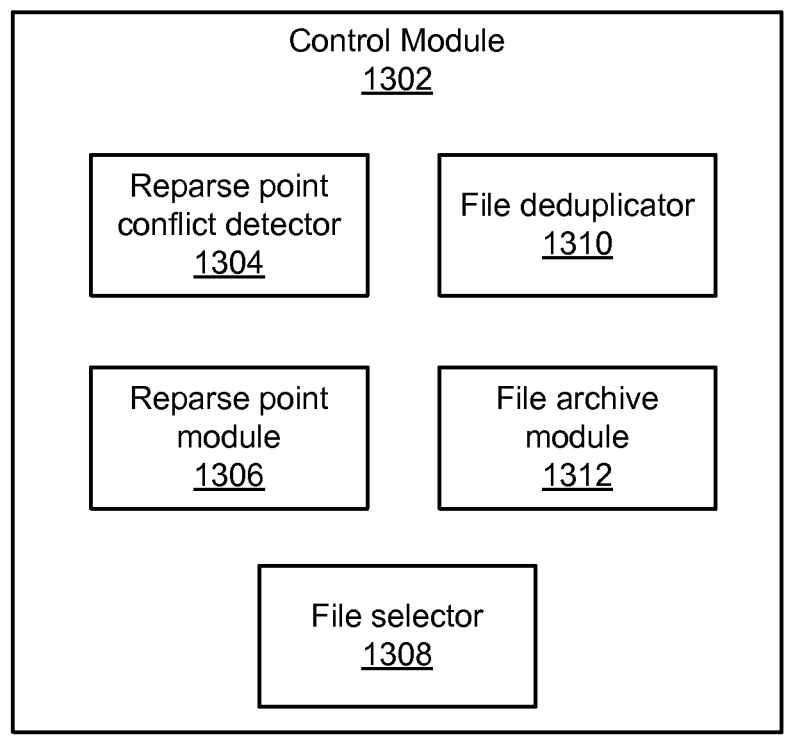
FIG. 13 is a block diagram illustrating an example control module of a node of a distributed storage system, according to one embodiment.

FIG. 13 is a block diagram 1300 of a control module 1302, such as control module 122, according to some embodiments. Control module 1302 includes a reparse point conflict detector 1304, a reparse point module 1306, a file selector 1308, a file deduplicator 1310, and/or a file archive module 1312. It is noted that in some embodiments, one or more of these elements may be combined. One or more elements of control module 1302 can be implemented in hardware and/or software, such as described below with reference to FIG. 14.

Reparse point conflict detector 1304 is configured to analyze files and/or detect a reparse point conflict, such as described with reference to methods 300-800, among others. Reparse point module 1306 is configured to resolve reparse point conflicts, such as described with reference to methods 300-800, among others. File selector 1308 is configured to select file(s) for archiving/deduplication, such as described with reference to methods 900-1200, among others. File deduplicator 1310 is configured to deduplicate file(s), such as described with reference to methods 900-1200, among others. File archive module 1312 is configured to archive file(s), such as described with reference to methods 300 and 900-1200, among others.

Figure 14:
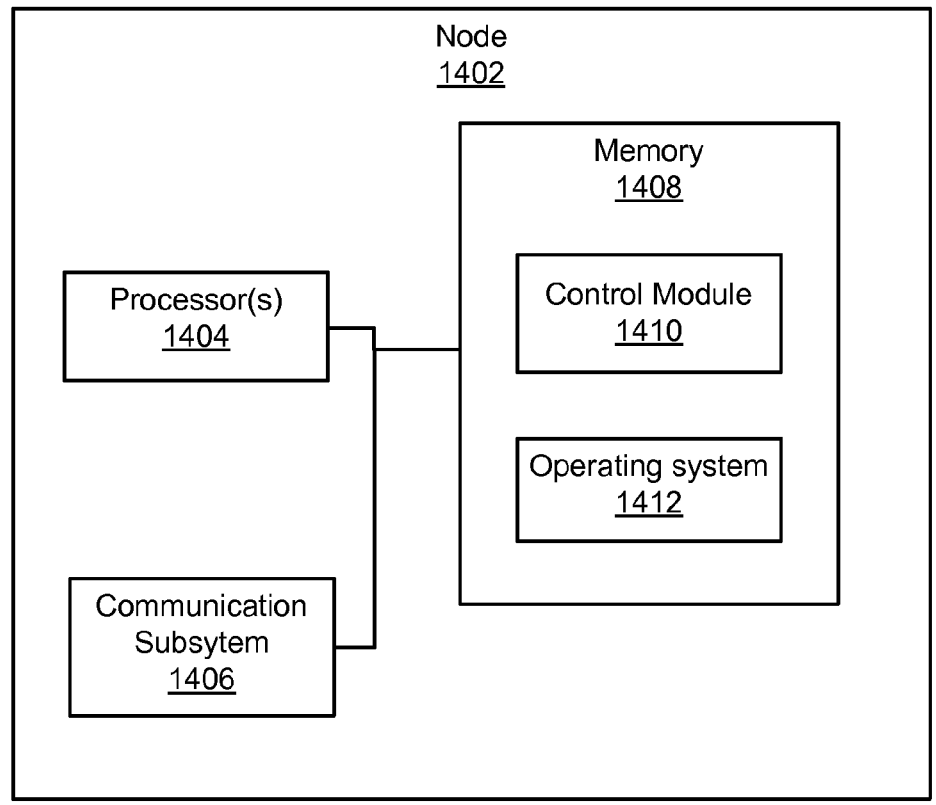
FIG. 14 is a block diagram illustrating an example node of a distributed storage system, according to one embodiment.

FIG. 14 is a block diagram 1400 illustrating an example node of a distributed storage system, according to one embodiment. Node 1402, which can implement nodes 104(1)-104(N) and/or node 112, includes a processor 1404, communication subsystem 1406, and a memory 1408. Memory 1408 includes a control module 1410 and operating system 1412. It is noted that one or more of element(s) of control module 1410 may be implemented as a software and/or hardware module. It is also noted that in some embodiments one or more of elements of node 1402 may not be used. Processor(s) 1404 executes one or more elements of control module 1410. Control module 1410 can be an implementation of control module 122 and/or control module 1302, and can implement at least portions of one or more of methods 300-1200.

Figure 15:
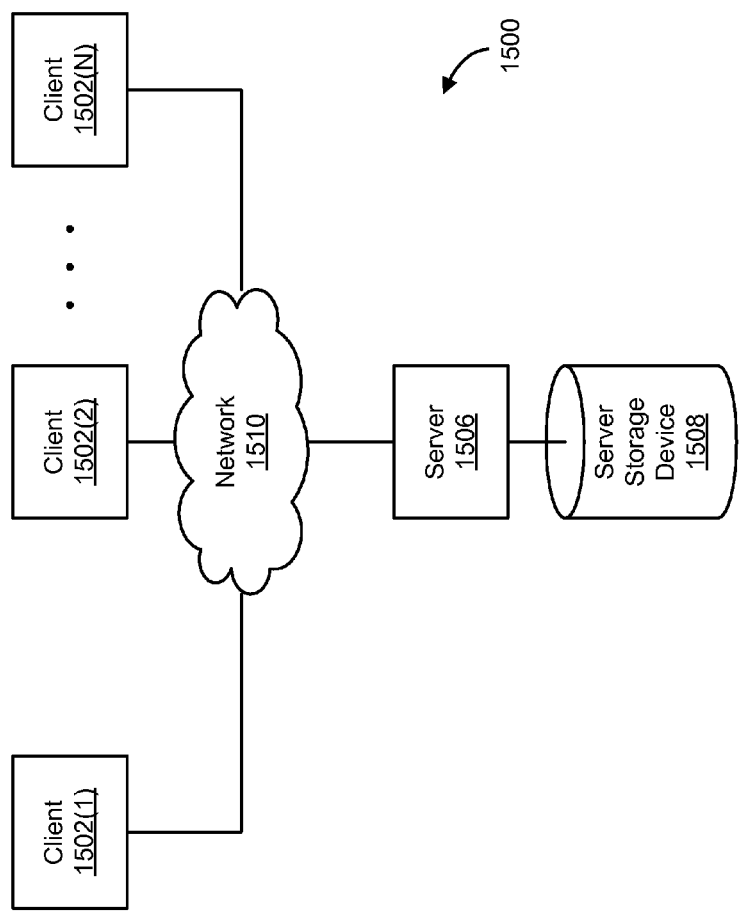
FIG. 15 is a block diagram illustrating a network architecture in which embodiments of the present application can be implemented.

Elements of network architecture can be implemented using different computer systems and networks. An example of one such network environment is described below with reference to FIG. 15. FIG. 15 is a simplified block diagram illustrating a network architecture 900 in which one or more clients are provided with access to a server via various network connections. As depicted in FIG. 15, clients 1502(1)-(N) are coupled to a network 1510, and so are able to access a server 1506 (which can be used to implement node(s) of FIGS. 1 and/or 14 via network 1510. Other servers (not shown) can be used instead to implement node(s) of FIGS. 1 and/or 14. A client can be implemented using, for example, a desktop computer, a laptop computer, a workstation, a server, a cell phone, a smart phone, a network-enabled personal digital assistant (PDA), or the like. An example of network 1510, which can be used by clients 1502(1)-(N) to access server 1506, is the Internet. Alternatively, access to server 1506 can be provided by a local area network (LAN) utilizing Ethernet, IEEE 802.11x, or some other communications protocol. As will be appreciated, server 1506 can be accessed by clients coupled directly thereto (not shown).

As also depicted on FIG. 15, server 1506 is coupled to a server storage device 1508, which includes a data volume such as storage devices 106(1)-106(M), storage devices 114(1)-114(P), and/or storage device 1202, among others. Server storage device 1508 can be implemented as a single storage device or a collection of storage devices. Server storage device 1508 can also be implemented as a storage area network, which couples remote storage devices to a server (e.g., server 1506), such that the remote storage devices appear as locally-attached storage devices to the server's OS, for example.

In light of the present disclosure, those of skill in the art will appreciate that server storage device 1508 can be implemented by any type of computer-readable storage medium, including, but not limited to, internal or external hard disk drives (HDD), optical drives (e.g., CD-R, CD-RW, DVD-R, DVD-RW, and the like), flash memory drives (e.g., USB memory sticks and the like), tape drives and the like. Alternatively, those of skill in the art will also appreciate that, in light of the present disclosure, network architecture 1500 can include other components such as routers, firewalls and the like that are not germane to the discussion of the present network and will not be discussed further herein. Those of skill in the art will also appreciate that other configurations are possible. For example, clients 1502(1)-(N) can be directly coupled to server storage device 1508 without the user of a server or Internet; server 1506 can be used to implement both the clients and the server; network architecture 1500 can be implemented without the use of clients 1502(1)-(N); and so on. As an example implementation of network architecture 1500, server 1506, services requests to data generated by clients 1502(1)-(N) to data stored in server storage device 1508. Any of the functionality of the nodes and/or modules can be implemented using one of such clients.

Figure 16:
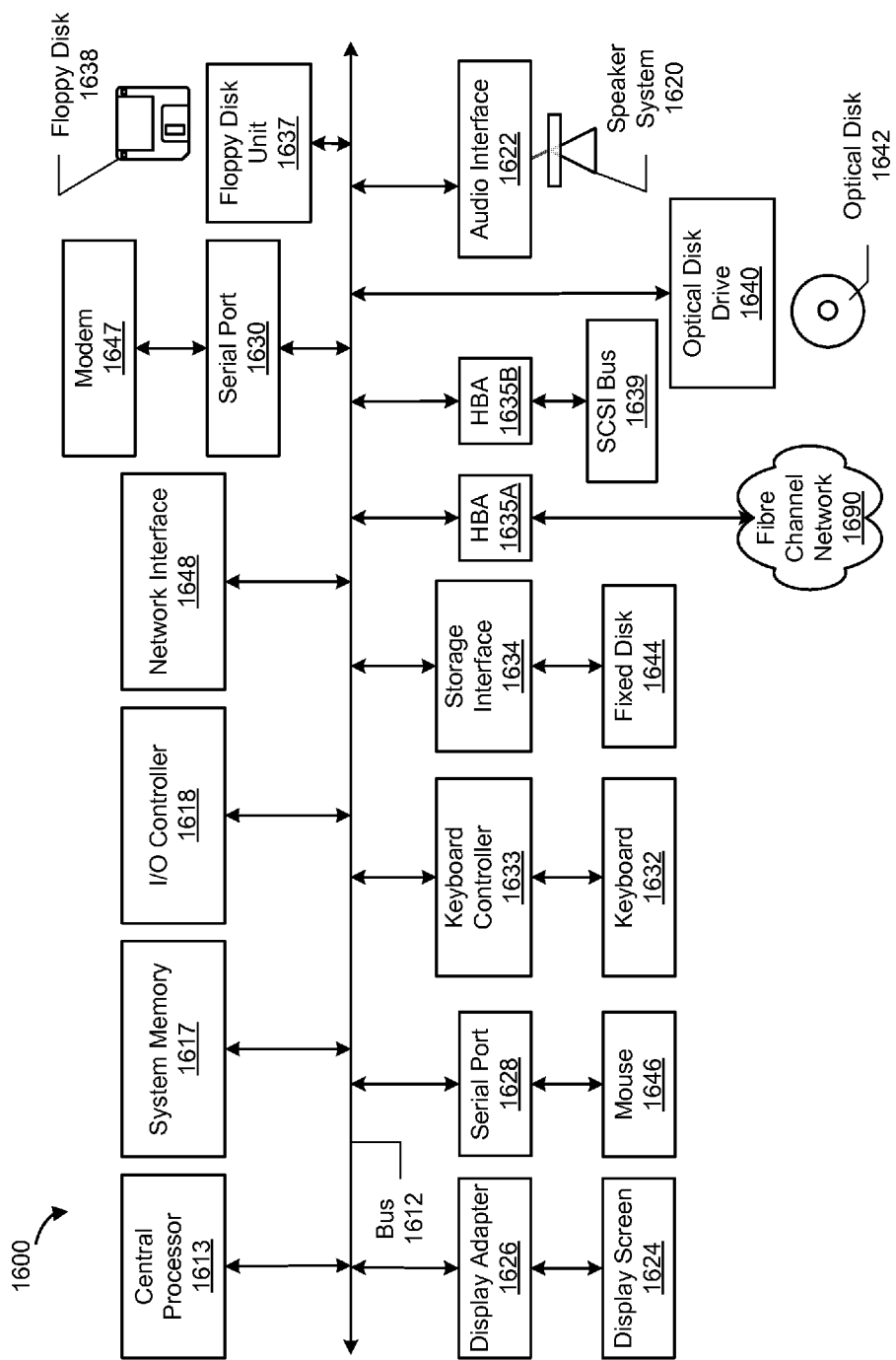
FIG. 16 is a block diagram that illustrates an example of a computer system suitable for implementing embodiments of the present application.

FIG. 16 depicts a block diagram of a computer system 1600 suitable for implementing the present disclosure. Computer system 1600 may be illustrative of various computer systems in the networked system of FIG. 1, such as node(s) and/or coordinator node(s), among others. Computer system 1600 includes a bus 1612 which interconnects major subsystems of computer system 1600, such as a central processor 1613, a system memory 1617 (typically RAM, but which may also include ROM, flash RAM, or the like), an input/output controller 1618, an external audio device, such as a speaker system 1620 via an audio output interface 1622, an external device, such as a display screen 1624 via display adapter 1626, serial ports 1628 and 1630, a keyboard 1632 (interfaced with a keyboard controller 1633), a storage interface 1634, a floppy disk drive 1637 operative to receive a floppy disk 1638, a host bus adapter (HBA) interface card 1635A operative to connect with a Fibre Channel network 1690, a host bus adapter (HBA) interface card 1635B operative to connect to a SCSI bus 1639, and an optical disk drive 1640 operative to receive an optical disk 1642. Also included are a mouse 1646 (or other point-and-click device, coupled to bus 1612 via serial port 1628), a modem 1647 (coupled to bus 1612 via serial port 1630), and a network interface 1648 (coupled directly to bus 1612).

Bus 1612 allows data communication between central processor 1613 and system memory 1617, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 1600 are generally stored on and accessed via a computer readable medium, such as a hard disk drive (e.g., fixed disk 1644), an optical drive (e.g., optical drive 1640), a floppy disk unit 1637, or other storage medium. Additionally, applications can be in the form of electronic signals modulated in accordance with the application and data communication technology when accessed via network modem 1647 or interface 1648.

Storage interface 1634, as with the other storage interfaces of computer system 1600, can connect to a standard computer readable medium for storage and/or retrieval of information, such as a fixed disk drive 1644. Fixed disk drive 1644 may be a part of computer system 1600 or may be separate and accessed through other interface systems. Modem 1647 may provide a direct connection to a remote server via a telephone link or to the Internet via an internet service provider (ISP). Network interface 1648 may provide a direct connection to a remote server via a direct network link to the Internet via a POP (point of presence). Network interface 1648 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 16 need not be present to practice the present disclosure. The devices and subsystems can be interconnected in different ways from that shown in FIG. 16. The operation of a computer system such as that shown in FIG. 16 is readily known in the art and is not discussed in detail in this application. Code for resolving reparse point conflicts and/or determining whether to archive/deduplicate file(s) (such as described above with reference to the methods of FIGS. 3-12, as well as functionality described with reference to FIGS. 2 and/or 13), etc., to implement the present disclosure can be stored in computer-readable storage media such as one or more of system memory 1617, fixed disk 1644, optical disk 1642, or floppy disk 1638. Memory 1620 is also used for storing temporary variables or other intermediate information during the execution of instructions by the processor 1613. The operating system provided on computer system 1600 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
analyzing a plurality of files, wherein
   the analyzing is based on one or more archiving policies,
   the analyzing comprises
      determining a percentage of free space on a volume, and
      determining whether the percentage of free space is greater than a threshold, and
   the plurality of files is stored on the volume;
determining, based on the analyzing, whether a first file of the plurality of files is to be archived;
in response to the analyzing indicating that the percentage of free space is greater than the threshold, selecting the first file for archiving;
determining, based on the analyzing, whether a first file of the plurality of files is to be deduplicated; and
in response to a determination to archive the first file, generating a request to archive the first file.

2. The method of claim 1, further comprising
determining whether a second file of the plurality of files is to be archived or deduplicated, wherein
   the determining whether the second file is to be archived or deduplicated is based at least on the analysis; and
in response to a determination to deduplicate the second file,
   selecting the second file for deduplication.

3. The method of claim 1, wherein
in response to the determination to archive the first file,
   determining whether to deduplicate remaining files of the plurality of files, wherein
      the remaining files do not comprise the first file.

4. The method of claim 1, further comprising
determining whether one or more additional files out of the remaining files are to be archived or deduplicated, wherein
   the plurality of files are stored using a plurality of blocks, and
   the determining whether the one or more additional files are to be archived or deduplicated comprises determining the additional file(s) that each share at least one respective block of the plurality of blocks with the first file.

5. The method of claim 1, wherein
the analyzing the plurality of files comprises:
   determining a percentage of unique blocks of the each file of the plurality of files, wherein
      the plurality of files are stored using a plurality of blocks, and
      each of the unique blocks is only used by a respective one of the plurality of files.

6. The method of claim 5, wherein
at least two of the plurality of files share a first block of the plurality of blocks.

7. The method of claim 5, wherein
the analyzing the plurality of files further comprises
   determining whether the percentage of unique blocks for the first file is greater than a threshold,
   in response to a determination that the percentage of unique blocks for the first file is greater than the threshold,
      selecting the first file for archiving.

8. The method of claim 1, wherein
in response to generating the request to archive the first file,
   detecting a reparse point conflict, wherein
      the first file is associated with a first reparse point, and
      archiving of the first file includes generation of another reparse point;
      detection of the reparse point conflict indicates a conflict between the first reparse point and the another reparse point.

9. The method of claim 1, further comprising:
in response to a determination not to archive a second file, generating a request to deduplicate the second file.

10. A system comprising:
one or more processors; and
a control module, wherein the control module is configured to
   analyze a plurality of files, wherein
      analyzing the plurality of files is based on one or more archiving policies,
      the analyzing comprises
         determining a percentage of free space on a volume, and
         determining whether the percentage of free space is greater than a threshold, and
      the plurality of files is stored on the volume,
   determine, based on the analyzing, whether a first file of the plurality of files is to be archived,
   in response to the analyzing indicating that the percentage of free space is greater than the threshold, select the first file for archiving,
   determine, based on the analyzing, whether a first file of the plurality of files is to be deduplicated, and
   in response to a determination to archive the first file, generate a request to archive the first file, and
   wherein the control module is configured to be executed using the one or more processors.

11. The system of claim 10, wherein
the control module is further configured to, in response to the determination to archive the first file,
   determine whether to deduplicate remaining files of the plurality of files, wherein
      the remaining files do not comprise the first file.

12. The system of claim 10, wherein
the control module being configured to determine whether to deduplicate remaining files of the plurality of files comprises
   the control module being further configured to
      determine whether one or more additional files out of the remaining files are to be archived or deduplicated, wherein
         the plurality of files are stored using a plurality of blocks, and
         the control module being configured to determine whether the one or more additional files are to be archived or deduplicated comprises
            the control module being configured to determine the additional file(s) that each share at least one respective block of the plurality of blocks with the first file.

13. The system of claim 10, wherein
the control module being configured to analyze the plurality of files comprises
   the control module being further configured to
      determine a percentage of unique blocks of the each file of the plurality of files, wherein
         the plurality of files are stored using a plurality of blocks, and each of the unique blocks is only used by a respective one of the plurality of files.

14. The system of claim 10, wherein
the control module being configured to analyze the plurality of files comprises
the control module being further configured to
determine whether the percentage of unique blocks for the first file is greater than a threshold, and
in response to a determination that the percentage of unique blocks for the first file is greater than the threshold, select the first file for archiving.

15. A non-transitory computer-readable storage medium comprising:
a first set of instructions, executable on a computer system, configured to analyze a plurality of files, wherein
the analyzing is based on one or more archiving policies,
the analyzing comprises
determining a percentage of free space on a volume, and
determining whether the percentage of free space is greater than a threshold, and
the plurality of files is stored on the volume,
a second set of instructions, executable on the computer system, configured to
determine, based on the analyzing, whether a first file of the plurality of files is to be archived,
in response to the analyzing indicating that the percentage of free space is greater than the threshold, select the first file for archiving, and
determine, based on the analyzing, whether a first file of the plurality of files is to be deduplicated, and
a third set of instructions, executable on the computer system, configured to, in response to a determination to archive the first file, generate a request to archive the first file.

16. The non-transitory computer-readable storage medium of claim 15, wherein the first set of instructions configured to analyze the plurality of files are further configured to
determine a percentage of unique blocks of the each file of the plurality of files, wherein
the plurality of files are stored using a plurality of blocks, each of the unique blocks is only used by a respective one of the plurality of files.

17. The non-transitory computer-readable storage medium of claim 15, wherein the first set of instructions configured to analyze the plurality of files are further configured to
determine a percentage of free space on a volume, wherein the volume is used to store the plurality of files.

* * * * *